Mar. 27, 1923.
C. F. HULL
1,450,084
AUTOMOBILE TIRE RACK
Original Filed Jan. 31, 1920　　3 sheets-sheet 1
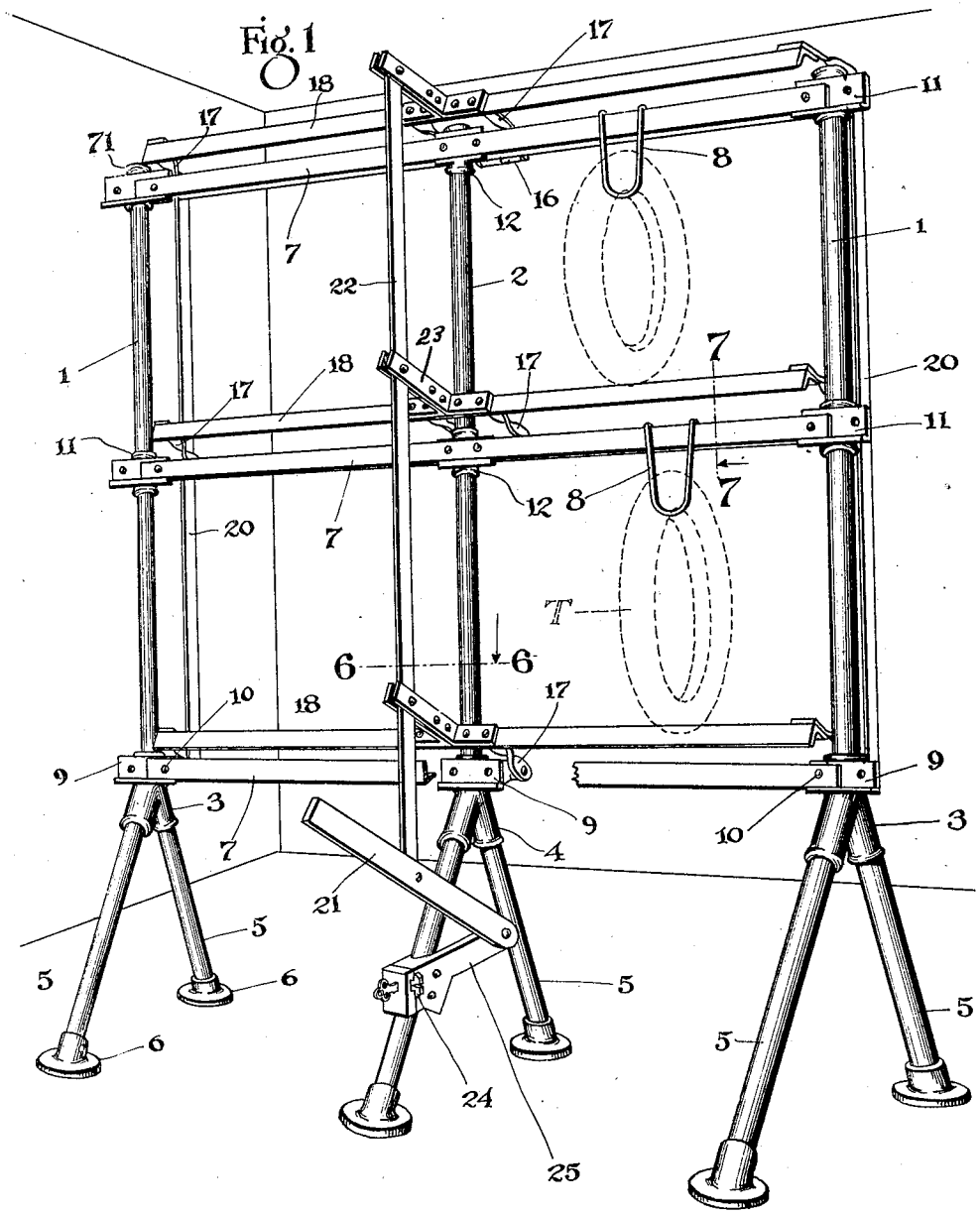
WITNESSES
INVENTOR
Charles F. Hull.
BY
ATTORNEYS

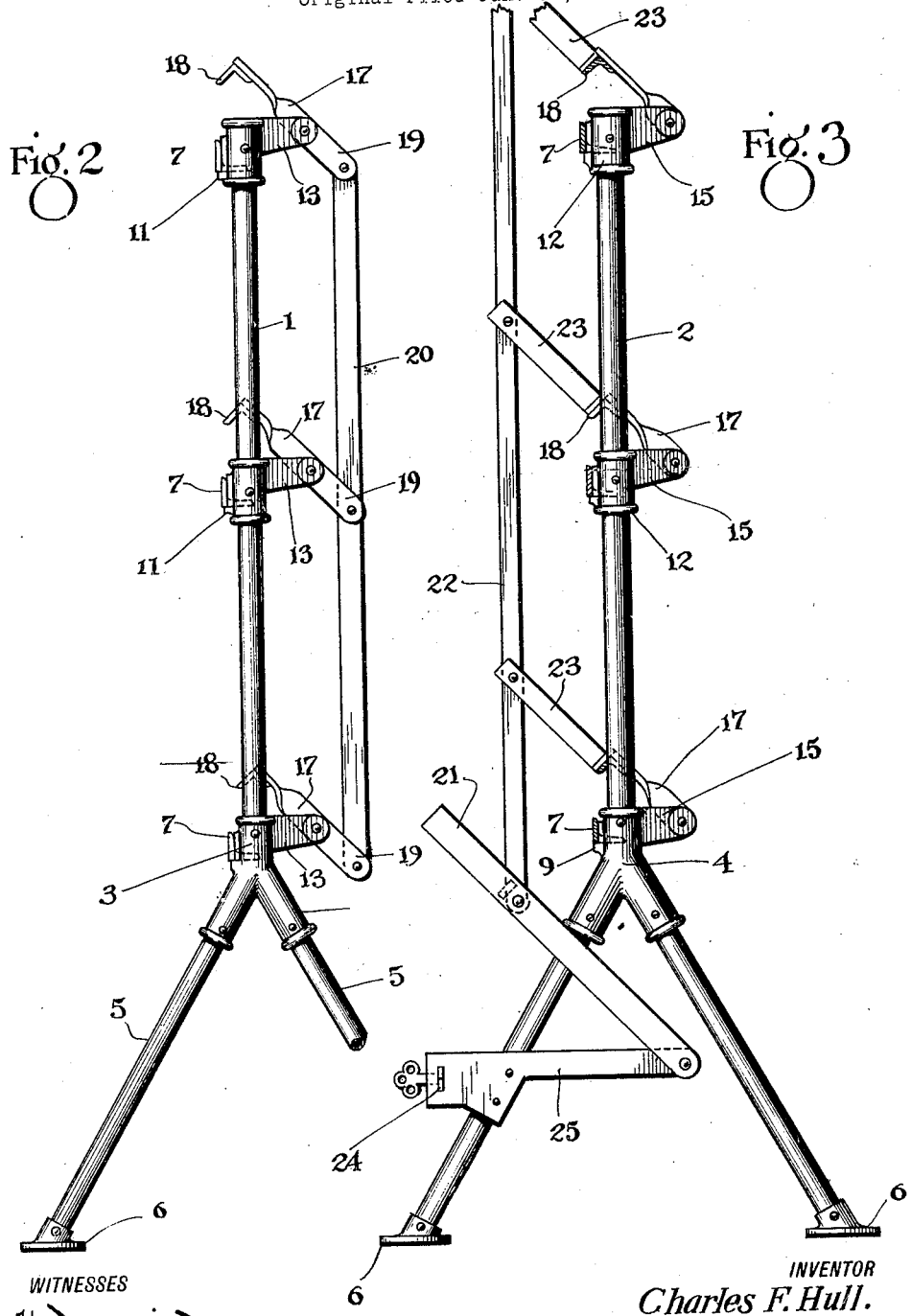

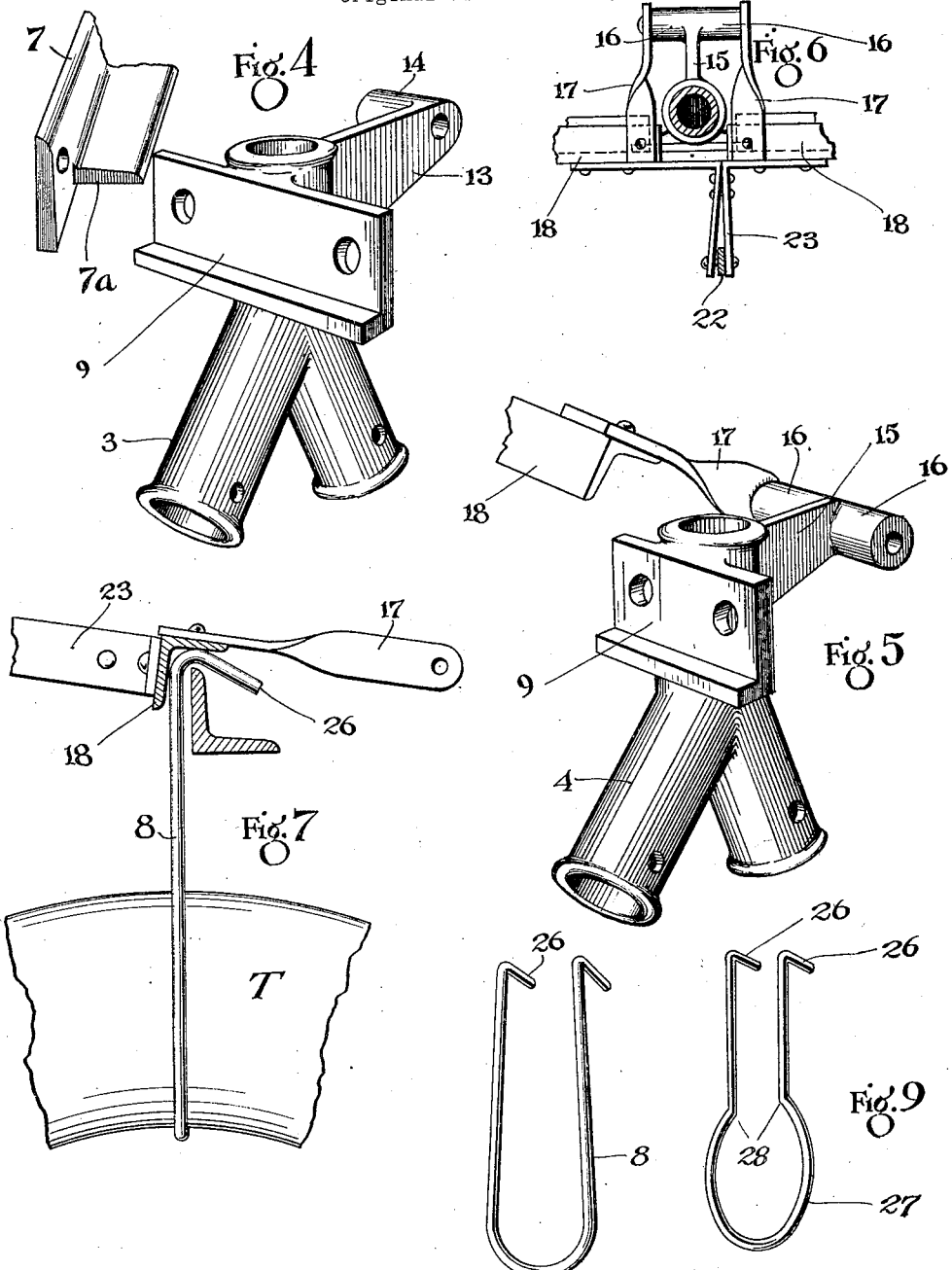

Patented Mar. 27, 1923.

1,450,084

UNITED STATES PATENT OFFICE.

CHARLES FRANKLIN HULL, OF HAGERSTOWN, MARYLAND.

AUTOMOBILE TIRE RACK.

Application filed January 31, 1920, Serial No. 355,500. Renewed January 19, 1923.

*To all whom it may concern:*

Be it known that I, CHARLES FRANKLIN HULL, a citizen of the United States, and a resident of Hagerstown, in the county of Washington and State of Maryland, have invented certain new and useful Improvements in Automobile Tire Racks, of which the following is a specification.

My invention relates to improvements in display devices, it being more particularly an improvement in racks for storing and displaying automobile tires, and it consists in the constructions, combinations and arrangements herein described and claimed.

One of the foremost objects of the invention is to provide a comparatively light yet sufficiently strong rack on which a moderate number of automobile tires may be hung by means of hooks or hangers, especially constructed for the purpose, means being embodied in the rack for simultaneously locking all of the hangers in place so as to prevent unauthorized removal of any of the tires.

A further object of the invention is to provide an automobile tire display and storage rack, the main framework of which is so constructed that additional sections may be added as requirements may make necessary.

A further object of the invention is to provide an automobile tire display and storage rack which has a plurality of locking bars which are capable of simultaneous operation by a single lever, which can be locked so as to prevent the lifting of said bars and the removal of any of the tires mounted on the rack.

Other objects and advantages will appear in the following specification, reference being had to the accompanying drawings, in which:—

Figure 1 is a perspective view of the improved automobile tire display and storage rack, two tires being shown in place in dotted lines and the locking bars being shown open, Figure 2 is a detail end elevation illustrating the end standard only and also showing the locking bars open, Figure 3 is a vertical section illustrating the central standard and its associated parts, Figure 4 is a detail perspective view of the end standard casting, Figure 5 is a detail perspective view of one of the central standard castings, Figure 6 is a detail horizontal section taken substantially on the line 6—6 of Figure 1, Figure 7 is a detail vertical section taken substantially on the line 7—7 of Figure 1, but showing the locking bar closed on the tire supporting hook or hanger, Figure 8 is a detail perspective view of the tire supporting hanger in its preferred form, and Figure 9 is a detail perspective view of a modified form of hanger.

The tire rack consists of end standards 1 and a central standard 2, to the lower ends of which are respectively fixed castings 3, 4. Diverging legs 5 are in turn secured in the branching Y-portions of these castings, the lower ends of the legs being supplied with floor plates 6 which may even be secured to the floor or used merely as supporting bases.

Horizontal supporting bars 7 of angle iron, span the spaces between the standards as shown, the tires T being hung on these bars for display and storage, by means of hangers 8 which are referred to more in detail below. In the case of the lowermost supporting bar 7, mounting thereof is made on the brackets 9 of the castings 3, 4, this bar as well as the others, stopping short of the extremities of these brackets so as to leave room for the attachment of other similar bars in case other tire holding sections are to be added on either end.

Any suitable fastening means may be employed, rivets 10 being illustrated by way of example. The other two supporting bars, namely, the mid and upper ones, are similarly attached to the intermediate and upper castings 11, 12, the respective pairs of which are substantially alike.

The end castings 9, 11 have rearwardly extending ears 13 ending in bosses 14 which turn inwardly with respect to the rack. The central castings 9, 12 also have rearwardly projecting ears 15 ending in bosses 16 on both sides.

These various bosses are for the purpose of pivotally attaching the various links or locking bar mounting means 17 which are made of suitable strap metal, given a quarter turn and then riveted on the flat upper sides of the locking angle bars 18, of which there is one for each supporting bar 7. In the case of the end links 17, extensions 19 are included for the purpose of attaching the reach bars 20, which not only assist in making all of the links and locking bars work as one, but also prevent the locking bars from being pried up at the ends so as to enable the removal of tires without first unlocking the lever 21.

An actuating bar 22 is pivoted to the lever 21 and to the several brackets 23 of the locking bars 18. When the lever 21 is down, the lock 24, carried by the mounting 25 to which the lever is pivoted, may be employed to lock the lever in position so that none of the locking bars can be raised. On the other hand, when the lever 21 is unlocked, it may be raised so as to lift all of the locking bars 18 into the position shown in Figures 1 and 2 so that any of the tire hangers 8 and tires T may be taken out.

The brackets 23 referred to above, consist of pieces of strap metal bent into angle shape so that the bases may be secured to the opposing ends of the locking bars 18 which are seprated or spaced in the middle, as clearly shown in Figure 6. This separation is necessary to give room for the upward movement of the locking bars, but since the brackets 23 are applied at these points, no strength or rigidity of the locking bars is sacrificed. It is to be observed that at the places where the supporting bars 7 are secured to the various castings, portions 7ª are cut out of the horizontal flanges so as to enable the application of the vertical parts to the castings, as illustrated in one instance in Figure 4.

The hangers in Figures 8 and 9 may be said to be equal in importance to that of the rack itself. Without a suitable hanger, the simplicity and cheapness of construction of the rack would be of little consequence. The hanger 8 in Figure 8 is bent up of a rod of metal of sufficient resiliency that the upper ends come closer together than the bottom loop is wide at the place where the tire is supported.

This formation creates a grip on the tire casing, which enables the tire to be lifted off any one of the supporting bars without the annoyance of having the tire rise up in the hanger. In other words, the hanger grips the tire and therefore the hooks 26 may readily be lifted off any one of the supporting bars.

The form in Figure 9 differs only from that in Figure 8 in that the bottom loop portion 27 is made more pronounced, shoulders 28 being left at the places where the shanks of the hanger bend off and extend in parallel strands. These shoulders 28 perhaps offer a more rigid abutment against the tire so that all possibility of the tire slipping inside of the hanger when lifting the later off, is avoided.

In operation hangers of either form are fitted over the tires T, and the hangers then hung on the supporting bars 7 so that the places between the various standards are filled. If it is desired to lock all of the tires in place, the lever 21 is moved downwardly so that all of the locking bars 18 are caused to clamp over the hook ends of the hangers, as clearly illustrated in Figure 7. As stated before, the end reach bars 20 prevent the extremities of the locking bars from being pried up for the removal of some or all of the tires.

One great outstanding advantage makes itself evident by the use of this particular kind of rack. A comparatively great number of tires may be stored in a minimum of space, and any particular tire may be taken out without the requirement of expending effort in shoving other tires aside. In places where tires are stood on the floor for storage, the whole horizontal tier depends on the continuity of the tier to prevent the row from falling over. When one tire is desired to be taken out, all of the other tires must be shoved aside, this causing no little annoyance both from the point of the strength required to be expended and also from the mis-shaping of the other tires which results when the weight of the tier is imposed thereon.

While the construction and arrangement of the improved tire rack as herein described and claimed is that of a generally preferred form, obviously modifications and changes may be made without departing from the spirit of the invention or the scope of the claims.

I claim:—

1. Automobile tire display means, comprising a hanger with hook ends, for resiliently gripping a tire to be displayed; and a display frame including a horizontal support on which the hanger is hooked, with means to be superposed on said support to lock the hanger in position.

2. An automobile tire display rack, comprising a pair of standards, with castings having brackets and ears; a supporting angle bar suitably secured to the brackets, a hanger for gripping a tire, with hook ends for mounting on the supporting bar, and a locking bar movable over the hook ends of the supporting bar, including links pivoted on said ears.

3. A tire display rack, comprising standards including castings with front brackets and rear ears; a horizontal supporting angle bar secured to each horizontal pair of brackets, but extending short of the extremities of said brackets to enable the addition of other display racks; an angle locking bar for each supporting bar, including links pivoted to said ears; a reach bar embracing extensions of certain of the links, preventing prying up of the locking bar at the extremities; and an actuating bar embracing brackets carried on the front of the locking bars, including a lever pivoted on a mounting carried by a portion of one of the standards, with means for locking the lever in a closed position.

4. A tire display rack, comprising a central and end standards, all with horizontal sets of castings including front brackets and rear ears; supporting angle bars suitably secured to horizontal sets of the brackets to provide a vertical series of supports; a suitable hanger for gripping a tire, with hook ends for mounting on said supporting bars; and locking means, including locking bars for each of the supporting bars, end-spaced adjacent to the central standard to make room for movement, each bar being braced by forwardly extending brackets in which an actuating bar is mounted, links extending from the locking bars to said ears for pivotal mounting, the end links having extensions, reach bars connecting the extensions to produce a simultaneous movement of all locking bars and a casting carried by a portion of the central standard, with a pivoted lever for operating the actuating bar, and a lock for locking said lever in a certain position.

5. A tire display rack, comprising a pair of standards, with sets of castings having attached horizontal supporting bars vertically spaced; a hanger resilient to grip a tire, with hook ends for mounting on a supporting bar, and locking means, including a locking bar for each supporting bar, with mounting means pivotally carried by each casting, reach bars embracing all of the mounting means, an actuating bar connected to parts of said mounting means, and a lever connected to said actuating bar to cause all locking bars to move simultaneously when the lever is shifted.

CHARLES FRANKLIN HULL.